US009584704B2

(12) United States Patent
Wan et al.

(10) Patent No.: US 9,584,704 B2
(45) Date of Patent: Feb. 28, 2017

(54) METHOD FOR DETECTING ELECTRONIC LIGHTING FLICKERING

(71) Applicant: Gean Technology Co. Limited, Hong Kong (HK)

(72) Inventors: Shan Mei Wan, Hong Kong (HK); Po Shu Bruce Lam, Hong Kong (HK); Chi Keung Yeung, Hong Kong (HK)

(73) Assignee: Gean Technology Co. Limited, Hong Kong (HK)

( * ) Notice: Subject to any disclaimer, the term of this patent is extended or adjusted under 35 U.S.C. 154(b) by 0 days.

(21) Appl. No.: 14/985,372

(22) Filed: Dec. 30, 2015

(65) Prior Publication Data

US 2016/0205290 A1    Jul. 14, 2016

Related U.S. Application Data

(60) Provisional application No. 62/100,909, filed on Jan. 8, 2015.

(51) Int. Cl.
*H04N 9/73* (2006.01)
*H04N 5/21* (2006.01)
*H04N 5/235* (2006.01)
*H04N 5/243* (2006.01)

(52) U.S. Cl.
CPC ............. *H04N 5/21* (2013.01); *H04N 5/2351* (2013.01); *H04N 5/2357* (2013.01); *H04N 5/243* (2013.01)

(58) Field of Classification Search
None
See application file for complete search history.

(56) References Cited

U.S. PATENT DOCUMENTS

| 7,009,642 | B2 * | 3/2006 | Hofer | H04N 5/2351 348/226.1 |
| 7,187,405 | B2 | 3/2007 | Poplin et al. | |
| 2007/0153094 | A1 * | 7/2007 | Noyes | H04N 5/235 348/226.1 |
| 2008/0303920 | A1 * | 12/2008 | Kinoshita | H04N 5/2353 348/226.1 |
| 2011/0187893 | A1 * | 8/2011 | He | H04N 9/73 348/226.1 |
| 2012/0194698 | A1 * | 8/2012 | Cami | H04N 5/2353 348/226.1 |
| 2014/0375838 | A1 * | 12/2014 | Shimoozono | H04N 5/2357 348/226.1 |

(Continued)

OTHER PUBLICATIONS

Samuel M. Berman et al., Human Electroretinogram Responses to Video Displays, Fluorescent Lighting, and Other High Frequency Sources, Optometry and Vision Science, 1990, pp. 645-662, vol. 68, No. 8.

(Continued)

*Primary Examiner* — Twyler Haskins
*Assistant Examiner* — Wesley Chiu

(57) ABSTRACT

A method for detecting electronic lighting flickering includes: taking a video of an electronic light with a duration of a predetermined period and a scanning frequency; extracting a predetermined number of frames of pictures from the video; determining a flickering frequency of the electronic light; determining at least one fixed reference point at each frame; and reconstructing a brightness waveform of the electronic light from the reference point in all frames of the video.

17 Claims, 10 Drawing Sheets

(56) References Cited

U.S. PATENT DOCUMENTS

| | | | | |
|---|---|---|---|---|
| 2014/0375848 | A1* | 12/2014 | Yamamoto | H04N 5/2355 348/241 |
| 2015/0138392 | A1* | 5/2015 | Sugawara | H04N 5/2351 348/226.1 |
| 2015/0229824 | A1* | 8/2015 | Tanaka | H04N 5/217 348/228.1 |
| 2015/0279023 | A1* | 10/2015 | Lam | G06T 7/0004 348/86 |
| 2016/0006919 | A1* | 1/2016 | Aoyama | H04N 5/2357 348/226.1 |
| 2016/0205290 | A1* | 7/2016 | Wan | H04N 5/21 348/497 |

OTHER PUBLICATIONS

Sergey Bezryadin et al., Brightness Calculation in Digital Image Processing, Technologies for Digital Fulfillment, 2007.
Jaen M. et al., Office Workers Visual Performance and Temporal Modulation of Fluorescent Lighting, Leukos, 2005, pp. 27-46, vol. 1, No. 4.
Spiros Kitsinelis et al., LED Flicker: A Drawback or an Opportunity?, Optics and Photonics Journal, 2013, pp. 33-66, vol. 3, No. 1.
Lehman B. et al., Biological Effects and Health Hazards from Flicker, Including Flicker That Is Too Rapid to See, IEEE Standard P1789, 2010.
Michael Poplawski et al., Exploring Flicker in Solid-State Lighting: What You Might Find, and How to Deal with It, Pacific Northwest National Laboratory.
Dwight Poplin, An Automatic Flicker Detection Method for Embedded Camera Systems, IEEE Transactions on Consumer Electronics, 2006, pp. 308-311, vol. 52, No. 2.
Veitch, J.A. et al., Modulation of Fluorescent Light: Flicker Rate and Light Source Effects on Visual Performance and Visual Comfort, Lighting Research and Technology, 1995, pp. 243-256, vol. 27, No. 4.
Martin Wany et al., CMOS Image Sensor with NMOS-Only Global Shutter and Enhanced Responsivity, IEEE Transactions on Electron Devices, 2003, pp. 57-62, vol. 50, No. 1.
Arnold Wilkins et al., Intermittent Illumination from Visual Display Units and Fluorescent Lighting Affects Movements of the Eyes Across Text, Human Factors, 1986, pp. 75-81, vol. 28, No. 1.
Arnold Wilkins et al., LED Lighting Flicker and Potential Health Concerns: IEEE Standard PAR1789 Update, Energy Conversion Congress and Exposition (ECCE), 2010, pp. 171-178.

* cited by examiner

METHOD FOR DETECTING ELECTRONIC LIGHTING FLICKERING

CROSS-REFERENCE TO RELATED APPLICATIONS

This application claims the benefit of U.S. non-provisional patent application Ser. No. 62/100,909 filed on Jan. 8, 2015; the contents of which is hereby incorporated by reference.

FIELD OF THE PATENT APPLICATION

The present patent application generally relates to electronic lighting technologies and more specifically to a method for detecting electronic lighting flickering.

BACKGROUND

In old times, incandescent light bulb is a major lighting equipment. But its efficiency is low. Lots of energy is wasted in the form of heat. So, the global trend of the lighting equipment is from incandescent bulb to CFL bulb, and then to LED bulb. The CFL bulb includes mercury which is toxic. The LED bulb is most energy efficient but there exists a LED flickering problem.

For incandescent bulbs and CFL bulbs, the light tube also has light flickering, but the problem for LED bulbs is more serious. If people are exposed to bulb which has invisible frequency (high frequency) flicker, it will trigger malaise, headaches and impaired visual performance. Also, if people are exposed to visible frequency (low frequency) flicker, it will trigger epileptic seizure, headaches and impaired visual performance.

Nowadays, a LED lamp is becoming a very common type of lighting equipment. If the user has a simple way to distinguish the extent of LED flickering, they can avoid using the lamp which is harmful to their health.

An actual lamp produces flickers which are rapid and repeated changes over time in the brightness of light, i.e. brightness waveform with a fixed frequency. For LED lamps, it is caused from the rapid and repeated change over time in current of its driver, which is an unavoidable phenomenon.

SUMMARY

The present patent application is directed to a method for detecting electronic lighting flickering. In one aspect, the method includes: taking a video of an electronic light with a duration of a predetermined period and a scanning frequency; extracting a predetermined number of frames of pictures from the video; determining a flickering frequency of the electronic light based on number of pixels between two consecutive bight lines in each frame, number of pixels across the frame, and time period for which the frame is captured; determining at least one fixed reference point at each frame; reconstructing a brightness waveform of the electronic light from the reference point in all frames of the video based on brightness value of the reference point in each frame and time location value of the reference point in each frame; and determining relationship between the flickering frequency of the electronic light and the scanning frequency of the video. If the flickering frequency is a multiple of the scanning frequency, the video is retaken with a different scanning frequency. If both the flickering frequency and the scanning frequency are multiples of a same number, additional videos of the electronic light are taken or number of the reference points is increased.

The flickering frequency of the electronic light may be determined based on a flickering period, the flickering period being determined based on ratio of the number of pixels between two consecutive bright lines or dark lines in each frame and the number of pixels across the frame, multiplied by the time period for which the frame is captured. The time location value of the reference point in each frame may be determined based on ratio of number of pixels between the reference point and a bright line next to the reference point and the number of pixels between two consecutive bight lines in the frame, multiplied by the flickering period.

If additional videos of the electronic light are taken, starting point of the brightness waveform of one video may be different from that of another video.

In another aspect, the present patent application provides a method for detecting electronic lighting flickering. The method includes: taking a video of an electronic light with a duration of a predetermined period and a scanning frequency; extracting a predetermined number of frames of pictures from the video; determining a flickering frequency of the electronic light; determining at least one fixed reference point at each frame; and reconstructing a brightness waveform of the electronic light from the reference point in all frames of the video.

The flickering frequency of the electronic light may be determined based on number of pixels between two consecutive bight lines in each frame, number of pixels across the frame, and time period for which the frame is captured.

The flickering frequency of the electronic light may be determined based on a flickering period, the flickering period being determined based on ratio of the number of pixels between two consecutive bright lines or dark lines in each frame and the number of pixels across the frame, multiplied by the time period for which the frame is captured.

The brightness waveform of the electronic light may be reconstructed from the reference point in all frames of the video based on brightness value of the reference point in each frame and time location value of the reference point in each frame. The time location value of the reference point in each frame may be determined based on ratio of number of pixels between the reference point and a bright line next to the reference point and the number of pixels between two consecutive bight lines in the frame, multiplied by the flickering period.

The method for detecting electronic lighting flickering may further include determining relationship between the flickering frequency of the electronic light and the scanning frequency of the video. If the flickering frequency is a multiple of the scanning frequency, the video may be retaken with a different scanning frequency.

If both the flickering frequency and the scanning frequency are multiples of a same number, additional videos of the electronic light may be taken. If both the flickering frequency and the scanning frequency are multiples of a same number, number of the reference points may be increased.

In yet another aspect, the present patent application provides a method for detecting electronic lighting flickering. The method includes: taking a video of an electronic light with a duration of a predetermined period and a scanning frequency, the video including a predetermined number of frames of pictures; determining a flickering frequency of the electronic light; determining at least one fixed reference point at each frame; determining relationship between the flickering frequency of the electronic light and the scanning frequency of the video; and reconstructing a brightness waveform of the electronic light from the reference point in all frames of the video based on the determined relationship.

The flickering frequency of the electronic light may be determined based on number of pixels between two consecutive bight lines in each frame, number of pixels across the frame, and time period for which the frame is captured. The flickering frequency of the electronic light may be determined based on a flickering period, the flickering period being determined based on ratio of the number of pixels between two consecutive bright lines or dark lines in each frame and the number of pixels across the frame, multiplied by the time period for which the frame is captured.

The brightness waveform of the electronic light may be reconstructed from the reference point in all frames of the video based on brightness value of the reference point in each frame and time location value of the reference point in each frame. The time location value of the reference point in each frame may be determined based on ratio of number of pixels between the reference point and a bright line next to the reference point and the number of pixels between two consecutive bight lines in the frame, multiplied by the flickering period.

If the flickering frequency is a multiple of the scanning frequency, the video may be retaken with a different scanning frequency. If both the flickering frequency and the scanning frequency are multiples of a same number, additional videos of the electronic light may be taken or number of the reference points may be increased.

BRIEF DESCRIPTIONS OF THE DRAWINGS

DETAILED DESCRIPTION

Reference will now be made in detail to a preferred embodiment of the method for detecting electronic lighting flickering disclosed in the present patent application, examples of which are also provided in the following description. Exemplary embodiments of the method for detecting electronic lighting flickering disclosed in the present patent application are described in detail, although it will be apparent to those skilled in the relevant art that some features that are not particularly important to an understanding of the method for detecting electronic lighting flickering may not be shown for the sake of clarity.

Furthermore, it should be understood that the method for detecting electronic lighting flickering disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
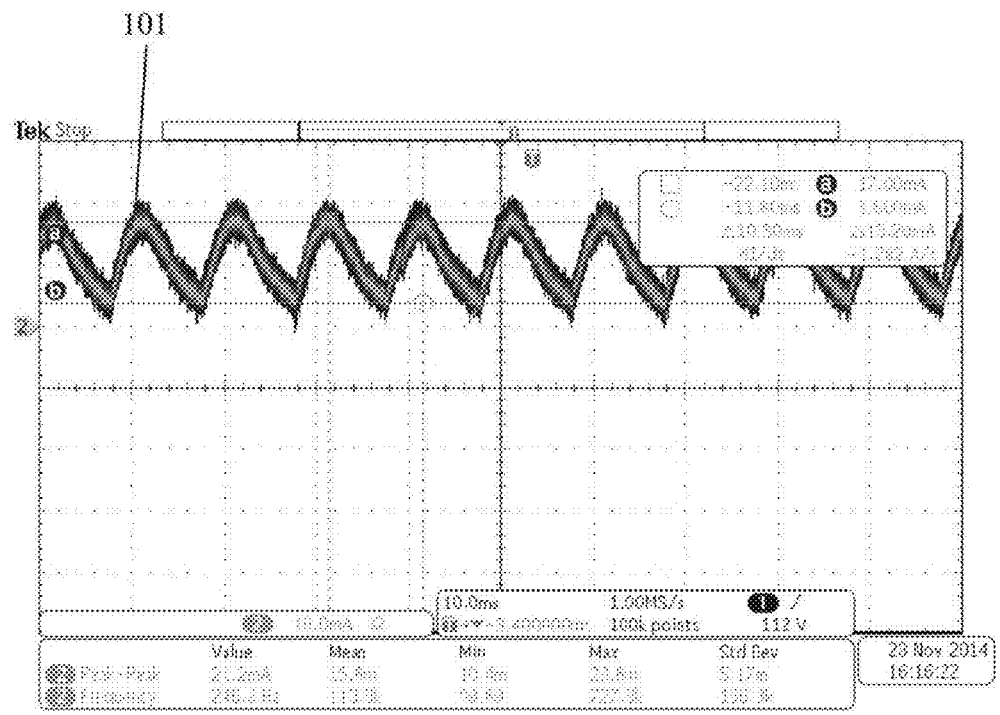
FIG. 1 shows an exemplary current waveform of a LED driver.

In the embodiments below, the method for detecting electronic lighting flickering is directed to a LED light. It is understood the method can be applied to other forms of electronic lighting with periodical flickering. FIG. 1 shows an exemplary current waveform 101 of a LED driver. The current waveform 101 has a fixed period. The LED flicker profile (brightness waveform of LED lamp produced) is the same as the current waveform 101. The flicker frequency is also exactly the same as the current frequency.

Figure 2:
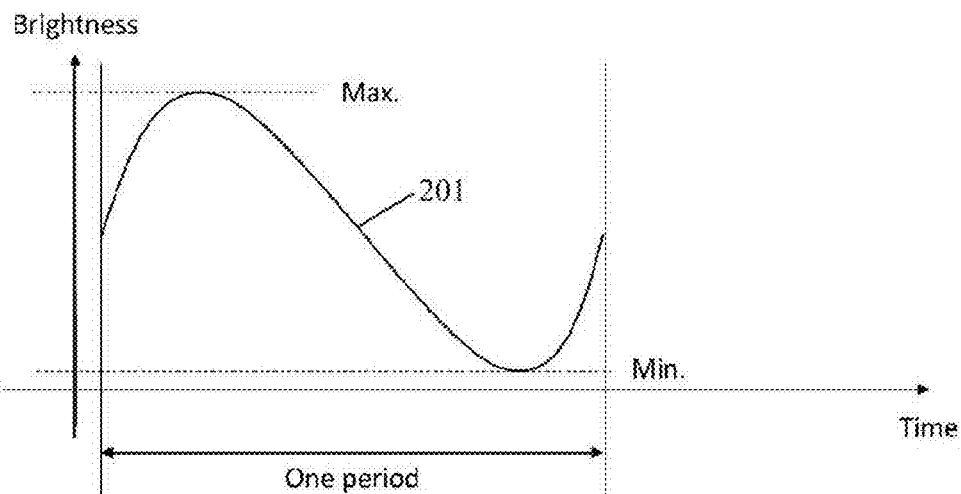
FIG. 2 shows an exemplary brightness waveform of light flickering of a LED light.

FIG. 2 shows an exemplary brightness waveform 201 of light flickering of a LED light. Flicker percentage, flicker index and flicker frequency are the metrics used to describe how severe the light flicker is. The higher the flicker percentage and flicker index, the more severe the light flicker is, wherein:

Flicker frequency=1/period

Flicker percentage=(max−min)/(max+min)×100%

Figure 3:
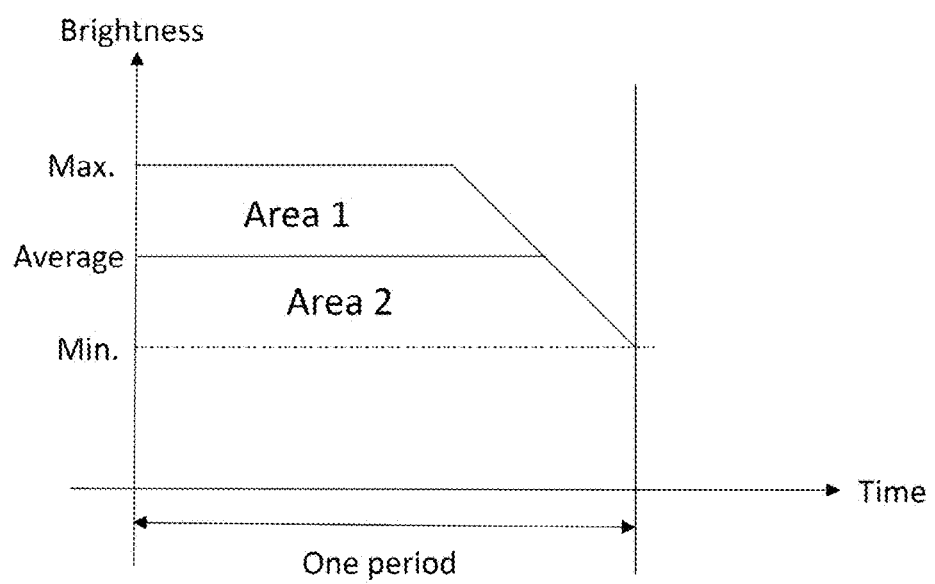
FIG. 3 shows another exemplary brightness waveform of light flickering of a LED light.

FIG. 3 shows another exemplary brightness waveform 301 of light flickering of a LED light. Referring to FIG. 3, Flicker index=Area above mean/Total Area=Area 1/(Area 1+Area 2).

According to an embodiment of the present patent application, the behavior (bright lines and dark lines) of light flickering produced in photo or video recorded by a digital or smartphone camera is used to find out the exact brightness waveform of light flicker and thus calculate the values of the flicker metrics.

Light flicker frequency can be found from a photo or a frame of a video. Smartphone camera usually takes 1/Y s to capture a photo or a frame of a video. Actually, the whole photo or frame is not captured in the same moment, but by column to column (rolling shutter technique). As the brightness of lamp varies due to light flicker, bright lines and dark lines appear in photo or frame.

Figure 4:
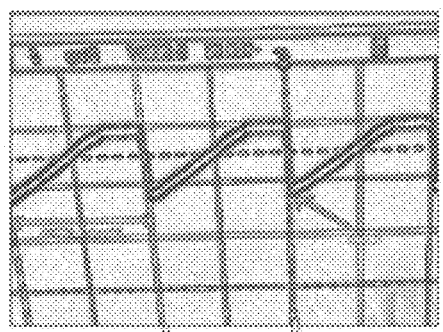
FIG. 4 shows a current waveform of a LED driver.
Figure 5:
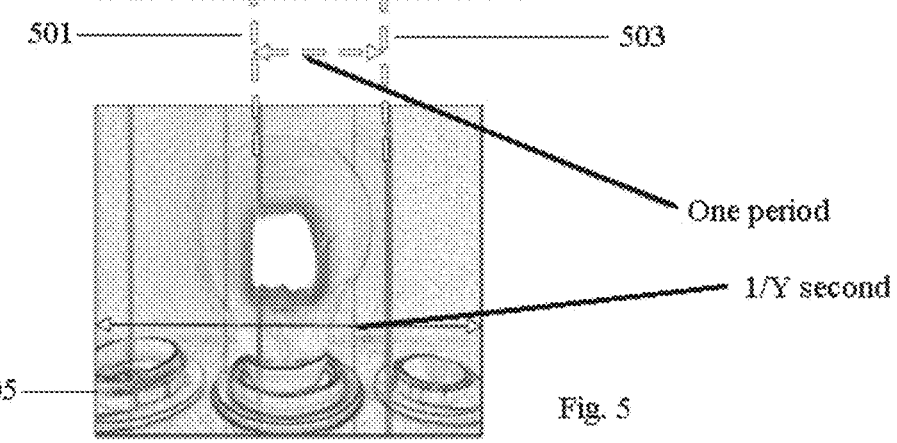
FIG. 5 shows dark and bright lines of light flickers in photos or videos recorded by a mobile phone camera.

In FIG. 5, the brightness pattern (bright lines and dark lines) in photo changes from right to left and matches with the current waveform pattern of the LED driver in FIG. 4, and in turn, matches with the brightness waveform of light flicker. As a result, by finding the ratio of the pixel number between two consecutive bright lines (501 and 503) and the pixel number across the photo or frame 505, and times it by 1/Y s, the period of the light flicker can be found.

Light flicker period=(1/Y)×(pixel no. between two consecutive bright or dark lines/total pixel no. across the photo or frame)

Light flicker frequency F=1/light flicker period

In this embodiment, as aforementioned, the flickering frequency of the electronic light is determined based on a flickering period, which is further determined based on ratio of the number of pixels between two consecutive bright lines (501 and 503) or dark lines in each frame and the number of pixels across the frame, multiplied by the time period (1/Y) for which the frame is captured.

Figures 6A, 6B, 6C:
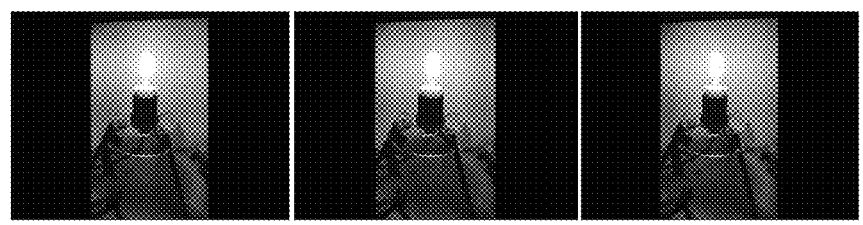
FIG. 6a shows an exemplary frame of a video of a LED light.
FIG. 6b shows another exemplary frame of a video of a LED light.
FIG. 6c shows yet another exemplary frame of a video of a LED light.
Figure 7:
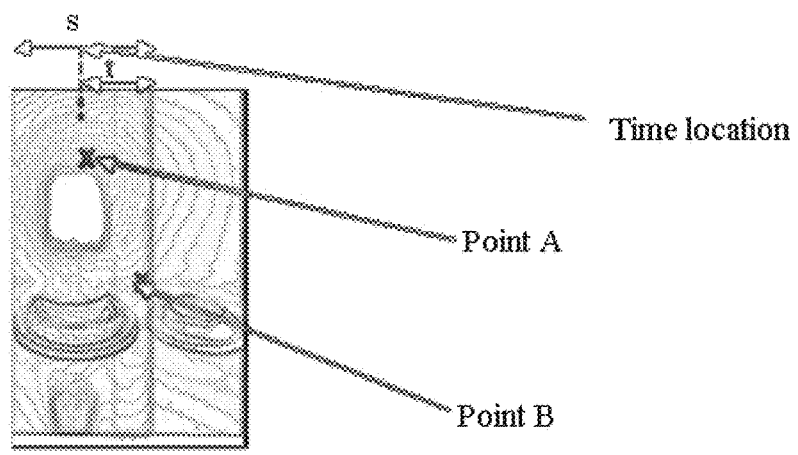
FIG. 7 shows a fixed reference point A and a fixed reference point B in a frame of a video of a LED light recorded by a smartphone camera.

Brightness waveform can be found from a video. Take 1 s of video from a smartphone camera. That is video has Y number of frames. The brightness pattern (bright lines and dark lines) of the frames are shifting from frame to frame, referring to frames in FIGS. 6a, 6b and 6c. In each of the frames, define a fixed reference point A, referring to FIG. 7.

Next, get the brightness value of point A in each frame. In addition, find the time location value of point A in the corresponding period in each frame. This can be done by calculating the ratio between the pixel number of t and s, and then times it by the light flicker period, referring to FIG. 7.

Figure 8:
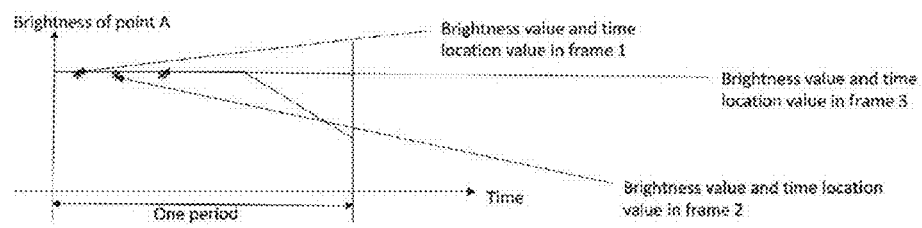
FIG. 8 shows a brightness waveform constructed from Y number of brightness and time location values of point A.

As a result, Y brightness values and Y corresponding time location values from the Y number of frames are obtained. The brightness waveform of light flicker can be reconstructed by the Y brightness and time location values, referring to FIG. 8.

In this embodiment, as aforementioned, the time location value of the reference point in each frame is determined based on ratio of number of pixels between the reference point and a bright line next to the reference point (corresponding to "t") and the number of pixels between two consecutive bight lines in the frame (corresponding to "s"), multiplied by the flickering period.

If the Y brightness and time locations values of point A are not sufficient enough to reconstruct the brightness waveform, another fixed point B (referring to FIG. 7) in each of the frames can be defined and another set of Y number of brightness and time location values is obtained. Thus 2 times Y number of brightness and time location values are used to reconstruct the brightness waveform after doing normalization of point A and point B. Moreover, more and more fixed points C, D, E, F, etc can be further defined.

In this embodiment, the Y number of brightness and time location values of point A, i.e. (A1, t1), (A2, t2) . . . , (AY, tY), will sometimes repeat. For examples, (A1, t1) value may be the same as (A4, t4) value. It is due to the relationship between the video scanning frequency f of the smartphone camera and the light flicker frequency F.

Figure 9:
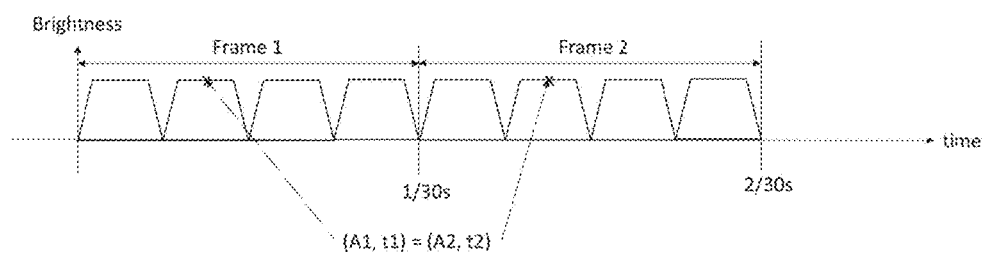
FIG. 9 shows a light flickering waveform where a smartphone camera takes Frame 1 and Frame 2.

Case 1: If the light flicker frequency F is a multiple of the video scanning frequency f, then (A1, t1)=(A2, t2)=(A3, t3)= . . . =(AY, tY). Suppose f is 30 Hz and F is 120 Hz. In the first 1/30 s, the mobile phone camera will take 1 frame, and light flicker waveform will pass 4 periods, i.e. 4 sets of bright and dark lines. In the second 1/30 s, the mobile phone camera will take a second frame, and the light flicker waveform will pass second 4 periods. The brightness and time location value of point A stays the same all the time, referring to FIG. 9.

Reconstructing the brightness waveform of the light flicker may not be performed by only a single brightness and time location value (A1, t1). This problem can be solved by changing the video scanning frequency f of the smartphone camera so that the light flicker frequency F is not a multiple of it anymore.

Figure 10:
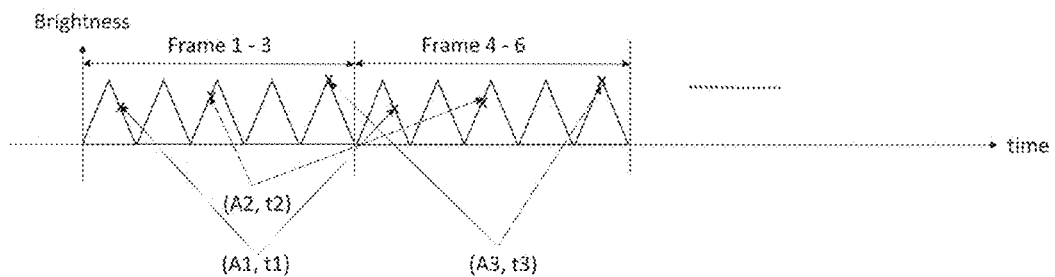
FIG. 10 shows a light flickering waveform where a smartphone camera takes Frames 1-6.

Case 2: If the light flicker frequency F is not a multiple of the video scanning frequency f, but both of them can be divided by a constant number, in other words, both of them are multiples of the same number, then the brightness and time location values start to repeat itself after n number of frames. Suppose f is 30 Hz and F is 50 Hz, F/f=50/30;

F/f=5/3 (both of them are divided by a constant number "10");

the denominator is "3", which means that for the first 3 frames, the brightness and time location values are different. But after the 3 frames, they will start to repeat, referring to FIG. 10.

Figure 11:
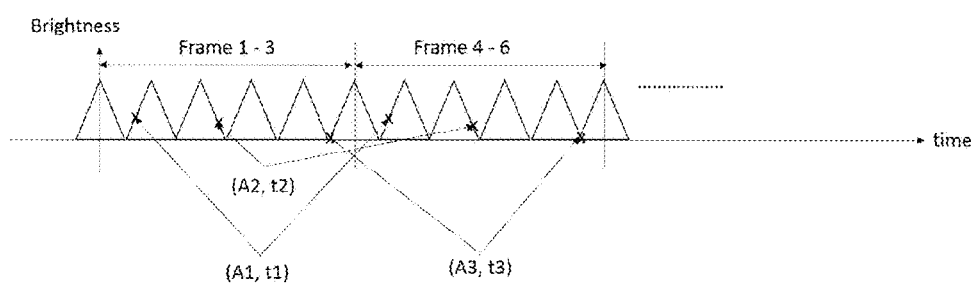
FIG. 11 shows a light flickering waveform where a smartphone camera takes Frames 1-6, in which the starting point of the brightness waveform is different from the waveform in FIG. 10.

Reconstructing the brightness waveform of the light flicker may not be performed by only 3 sets of brightness and time location values of the point A. This can be solved by getting more brightness and time location values by:
1. Defining a lot of fixed points (B, C, D, E, etc.) rather than just a single point A.
2. Taking more videos, because the starting point of the brightness waveform of light flicker may shift in each video. As shown in FIG. 11, this is the second video, in which the starting point of the brightness waveform is different from video 1 in FIG. 10.

Figure 12:
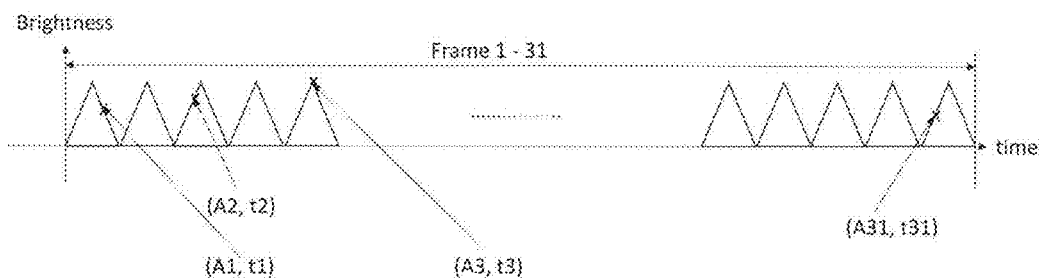
FIG. 12 shows light flickering waveform where a smartphone camera takes Frames 1-31.

Case 3: If the light flicker frequency F is not a multiple of the video scanning frequency f, and both of them cannot be divided by a constant number, then (A1, t1), (A2, t2) . . . (AY, tY) will not repeat. Suppose f is 31 Hz and F is 50 Hz, F/f=50/31. The denominator is "31", which means that for the 31 frames, the brightness and time location values are different. The brightness waveform of the light flicker can be reconstructed by the 31 brightness and time location values of the single point A, referring to FIG. 12.

Figure 13:
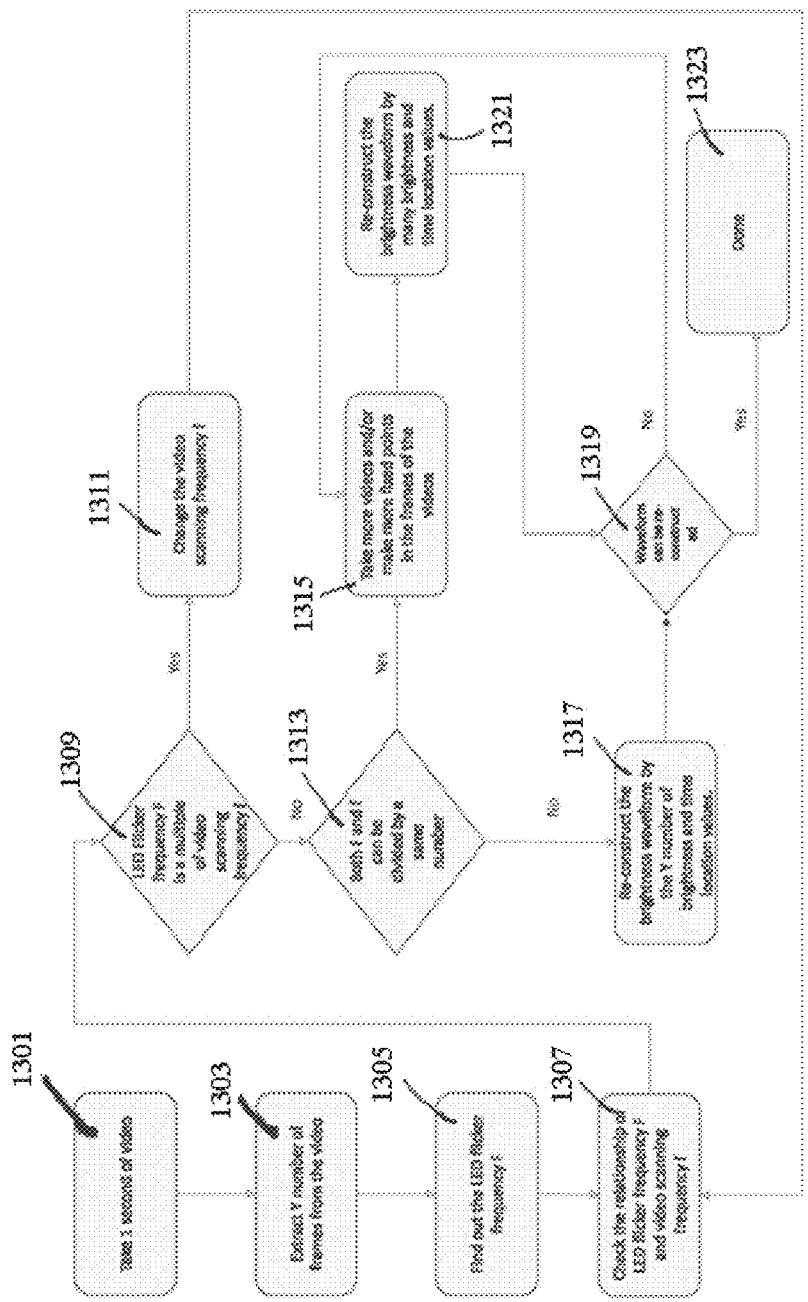
FIG. 13 is a flow chart illustrating a method for detecting electronic lighting flickering in accordance with an embodiment of the present patent application.

FIG. 13 shows the overall steps on how to reconstruct the brightness waveform by taking video of a light flicker. The steps will be described in details according to the following example.

Step 1301: Take 1 s of video

As shown in FIG. 13, a smartphone camera is used to take 1 s of video for a bulb. The video scanning frequency f of the smartphone camera is 30 Hz. Bright lines and dark lines appear in the video and they are shifting from frame to frame.

Figure 14:
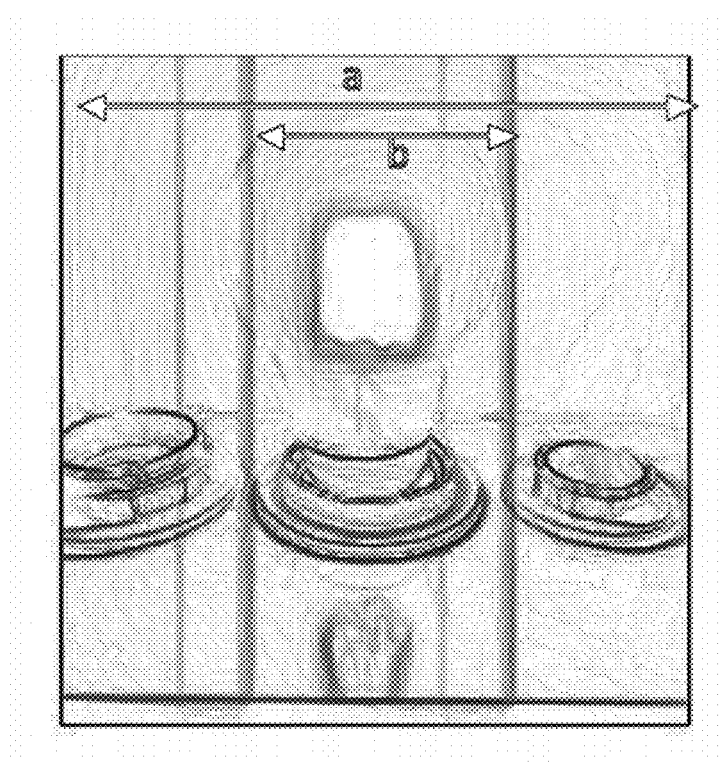
FIG. 14 illustrates that the period of a brightness waveform can be calculated by calculating the ratio of the pixel number of "a" and the pixel number of "b" and times it by $1/30$ s.

Step 1303 and Step 1305: Extract 30 frames from the video and find the light flicker frequency F. As shown in FIG. 14, one frame from the video can be selected to calculate the period of the brightness waveform. It is done by calculating the ratio of the pixel number of "a" and the pixel number of "b" and times it by 1/30 s. The period is around 0.01 s, which means the light flicker frequency F is around 100 Hz.

Step 1307: Check the relationship of light flicker frequency and video scanning frequency.

As mentioned above, there are three cases. When falling into case 1, that is, the light flicker frequency F is a multiple of the video scanning frequency f (step 1309), the video scanning frequency f can be changed (1311) and then the relationship of light flicker frequency and video scanning frequency can be checked again (step 1307).

When falling into case 2, that is, the light flicker frequency F is not a multiple of the video scanning frequency f, but both of them can be divided by a constant number (step 1313), in other words, both of them are multiples of the same number, more videos can be taken and/or more fixed points in the frames of the videos can be made (step 1315).

When falling into case 3, that is, the light flicker frequency F is not a multiple of the video scanning frequency f, and both of them cannot be divided by a constant number, the waveform can be reconstructed (step 1317).

In this embodiment, as an example, the brightness pattern of frame 1, 2 and 3 are different, but start to repeat after the $3^{rd}$ frame, which means the brightness pattern of frame 1 is the same as that of frame 4, 7, 10, 13, 16, 19, 22, 25, 28, the brightness pattern of frame 2 is the same as that of frame 5, 8, 11, 14, 17, 20, 23, 26, 29 and the brightness pattern of frame 3 is the same as that of frame 6, 9, 12, 15, 18, 21, 24, 27, 30.

It falls into case 2 as mentioned above:
F/f=100/30;
F/f=10/3;
the denominator is 3, thus after 3 frames, the brightness pattern will start to repeat.

Figure 15:
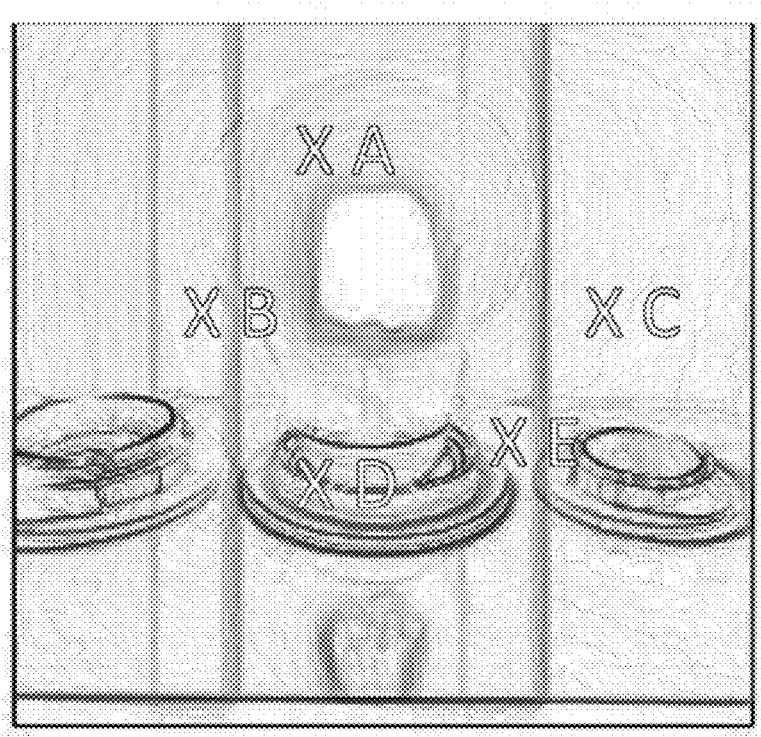
FIG. 15 shows five fixed reference points next to a light bulb in a frame.

Step 1315 (taking more videos and define more fixed points in the frames of the video) is executed in this case. Referring to FIG. 15, five more videos can be taken and five fixed reference points (A, B, C, D and E) in the frames of the 5 video can be defined. Thus for point A, 15 sets of brightness and time location values from the 5 videos can be collected. For point B, another 15 sets can be got, and same as point C, D and E. As a result, after doing normalization of all the points, 75 sets of brightness and time location values can be achieved.

Figure 16:
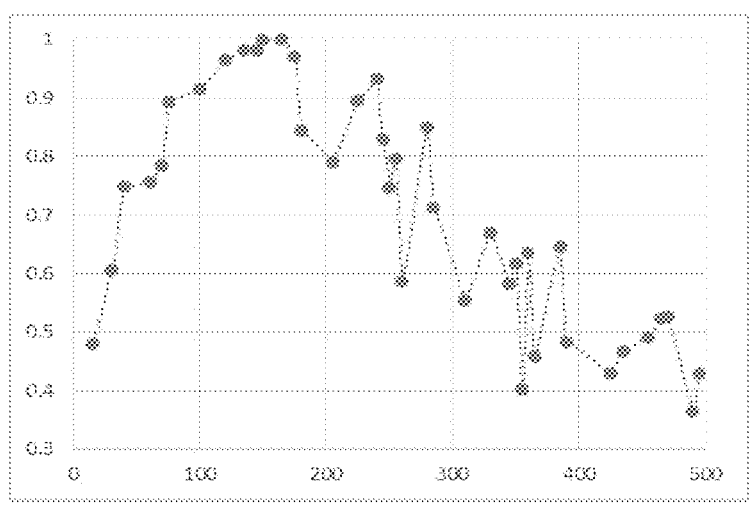
FIG. 16 illustrates reconstruction of a brightness waveform of light flickering of a LED light.

Then step 1321 (reconstructing the brightness waveform) is executed. As shown in FIG. 16, the brightness waveform of the light flicker is reconstructed. Some of the brightness and time location values may overlap. In this case, the average value of them can be taken.

After that step 1319 (checking if brightness waveform can be reconstructed or not) is executed. In this case, the brightness waveform can be reconstructed, and the process ends at step 1323.

After reconstructing the brightness waveform, the flicker metrics can be calculated: flicker percentage and flicker index to determine whether the light flicker is severe or not. When taking videos, there exist some background noises. Those noises include other background light sources and the vibration of the digital or smartphone camera. However, they can be filtered out by noise filtering technology. It is understood the method for detecting electronic lighting flickering provided by the above embodiments can be implemented by a mobile device, such as a mobile phone or tablet, a digital camera, a programmed computer and etc.

While the present patent application has been shown and described with particular references to a number of embodiments thereof, it should be noted that various other changes or modifications may be made without departing from the scope of the present invention.

What is claimed is:

1. A method for detecting electronic lighting flickering, the method comprising:
   taking a video, with a duration of a predetermined period and a scanning frequency, of an electronic light;
   extracting a predetermined number of frames of pictures from the video;
   determining a flickering frequency of the electronic light based on number of pixels between two consecutive bright lines in each frame, number of pixels across the frame, and time period for which the frame is captured;
   determining at least one fixed reference point at each frame;
   reconstructing a brightness waveform of the electronic light from the reference point in all frames of the video based on brightness value of the reference point in each frame and time location value of the reference point in each frame; and
   determining relationship between the flickering frequency of the electronic light and the scanning frequency of the video; wherein:
   if the flickering frequency is a multiple of the scanning frequency, the video is retaken with a different scanning frequency; and
   if both the flickering frequency and the scanning frequency are multiples of a same number, additional videos of the electronic light are taken or number of the reference points is increased.

2. The method for detecting electronic lighting flickering of claim 1, wherein the flickering frequency of the electronic light is determined based on a flickering period, the flickering period being determined based on ratio of the number of pixels between two consecutive bright lines or dark lines in each frame and the number of pixels across the frame, multiplied by the time period for which the frame is captured.

3. The method for detecting electronic lighting flickering of claim 2, wherein the time location value of the reference point in each frame is determined based on ratio of number of pixels between the reference point and a bright line next to the reference point and the number of pixels between two consecutive bright lines in the frame, multiplied by the flickering period.

4. The method for detecting electronic lighting flickering of claim 1, wherein if additional videos of the electronic light are taken, starting point of the brightness waveform of one video is different from that of another video.

5. A method for detecting electronic lighting flickering, the method comprising:
   taking a video, with a duration of a predetermined period and a scanning frequency, of an electronic light;
   extracting a predetermined number of frames of pictures from the video;
   determining a flickering frequency of the electronic light;
   determining at least one fixed reference point at each frame; and
   reconstructing a brightness waveform of the electronic light from the reference point in all frames of the video, wherein the brightness waveform of the electronic light is reconstructed from the reference point in all frames of the video based on brightness value of the reference point in each frame and time location value of the reference point in each frame; and the time location value of the reference point in each frame is determined based on ratio of number of pixels between the reference point and a bright line next to the reference point and the number of pixels between two consecutive bright lines in the frame, multiplied by the flickering period.

6. The method for detecting electronic lighting flickering of claim 5, wherein the flickering frequency of the electronic light is determined based on number of pixels between two consecutive bright lines in each frame, number of pixels across the frame, and time period for which the frame is captured.

7. The method for detecting electronic lighting flickering of claim 6, wherein the flickering frequency of the electronic light is determined based on a flickering period, the flickering period being determined based on ratio of the number of pixels between two consecutive bright lines or dark lines in each frame and the number of pixels across the frame, multiplied by the time period for which the frame is captured.

8. The method for detecting electronic lighting flickering of claim 5 further comprising determining relationship between the flickering frequency of the electronic light and the scanning frequency of the video.

9. The method for detecting electronic lighting flickering of claim 8, wherein if the flickering frequency is a multiple of the scanning frequency, the video is retaken with a different scanning frequency.

10. The method for detecting electronic lighting flickering of claim 8, wherein if both the flickering frequency and the scanning frequency are multiples of a same number, additional videos of the electronic light are taken.

11. The method for detecting electronic lighting flickering of claim 8, wherein if both the flickering frequency and the scanning frequency are multiples of a same number, number of the reference points is increased.

12. A method for detecting electronic lighting flickering, the method comprising:
   taking a video, with a duration of a redetermined period and a scanning frequency, of an electronic light, the video comprising a predetermined number of frames of pictures;
   determining a flickering frequency of the electronic light;
   determining at least one fixed reference point at each frame:
   determining relationship between the flickering frequency of the electronic light and the scanning frequency of the video; and
   reconstructing a brightness waveform of the electronic light from the reference point in all frames of the video based on the determined relationship,
   wherein if the flickering is a multiple of the scanning frequency, the video is retake with a different scanning frequency.

13. The method for detecting electronic lighting flickering of claim 12, wherein the flickering frequency of the electronic light is determined based on number of pixels between two consecutive bright lines in each frame, number of pixels across the frame, and time period for which the frame is captured.

14. The method for detecting electronic lighting flickering of claim 13, wherein the flickering frequency of the electronic light is determined based on a flickering period, the flickering period being determined based on ratio of the number of pixels between two consecutive bright lines or dark lines in each frame and the number of pixels across the frame, multiplied by the time period for which the frame is captured.

15. The method for detecting electronic lighting flickering of claim 12, wherein the brightness waveform of the electronic light is reconstructed from the reference point in all frames of the video based on brightness value of the reference point in each frame and time location value of the reference point in each frame.

16. The method for detecting electronic lighting flickering of claim 15, wherein the time location value of the reference point in each frame is determined based on ratio of number of pixels between the reference point and a bright line next to the reference point and the number of pixels between two consecutive bright lines in the frame, multiplied by the flickering period.

17. The method for detecting electronic lighting flickering of claim 12, wherein if both the flickering frequency and the scanning frequency are multiples of a same number, additional videos of the electronic light are taken or number of the reference points is increased.

* * * * *